(12) United States Patent
Shelton

(10) Patent No.: US 6,481,166 B2
(45) Date of Patent: Nov. 19, 2002

(54) WEATHER SHELTER

(76) Inventor: Andrew B. Shelton, 262 Fayetteville Rd., Fairburn, GA (US) 30213

(*) Notice: Subject to any disclaimer, the term of this patent is extended or adjusted under 35 U.S.C. 154(b) by 0 days.

(21) Appl. No.: 09/834,018

(22) Filed: Apr. 12, 2001

(65) Prior Publication Data

US 2002/0148176 A1 Oct. 17, 2002

(51) Int. Cl.[7] .................................................. E04H 9/00
(52) U.S. Cl. .................... 52/167.1; 52/81.4; 52/79.4; 52/169.6
(58) Field of Search .................... 52/28, 81.4, 81.1, 52/86, 79.4, 79.5, 79.12, 167.1, 169.6, 741.3, 745.07, 745.08

(56) References Cited

U.S. PATENT DOCUMENTS

| | | | | |
|---|---|---|---|---|
| 970,873 A | * | 9/1910 | Bear | 52/23 X |
| 1,137,689 A | * | 4/1915 | Allsteadt | 52/82 |
| 1,193,767 A | * | 8/1916 | Crisell | 52/82 |
| 2,278,956 A | * | 4/1942 | Wagner | 52/81.4 |
| 2,413,243 A | * | 12/1946 | Neff | 52/81.4 |
| 2,724,871 A | * | 11/1955 | Levine | 52/247 |
| 3,065,574 A | * | 11/1962 | Piana | 52/309.1 |
| 3,186,523 A | * | 6/1965 | Brisse | 52/149 |
| RE26,121 E | | 12/1966 | Wiegard | |
| D211,783 S | * | 7/1968 | Turner | 52/81.1 X |
| 3,562,975 A | | 2/1971 | Moss | |
| 3,648,420 A | * | 3/1972 | Nelson | 52/86 |
| 3,924,367 A | * | 12/1975 | Stewart | 52/81.4 |
| 4,126,972 A | * | 11/1978 | Silen | 52/34 |
| 4,324,074 A | * | 4/1982 | South et al. | 52/2.15 |
| 4,569,166 A | * | 2/1986 | Buchmuller | 52/86 |
| 4,625,468 A | | 12/1986 | Hampel | |
| 4,848,046 A | * | 7/1989 | Wallhead | 52/81.4 |
| 5,671,568 A | | 9/1997 | Armanno, Sr. | |
| 5,921,043 A | * | 7/1999 | McDonald | 52/309.9 |
| 6,131,343 A | | 10/2000 | Jackson, Jr. | |
| 6,151,841 A | * | 11/2000 | Green | 52/79.4 |

* cited by examiner

Primary Examiner—Carl D. Friedman
Assistant Examiner—Brian E. Glessner
(74) Attorney, Agent, or Firm—Technoprop Colton LLC

(57) ABSTRACT

A method and apparatus for a weather shelter having a base, the base having a peripheral edge and being secured to the ground, a dome with a circumferential edge, wherein the dome fits completely over the base, the circumferential edge of the dome is attached proximally to the peripheral edge of the base by an attachment means, and a doorway.

12 Claims, 10 Drawing Sheets

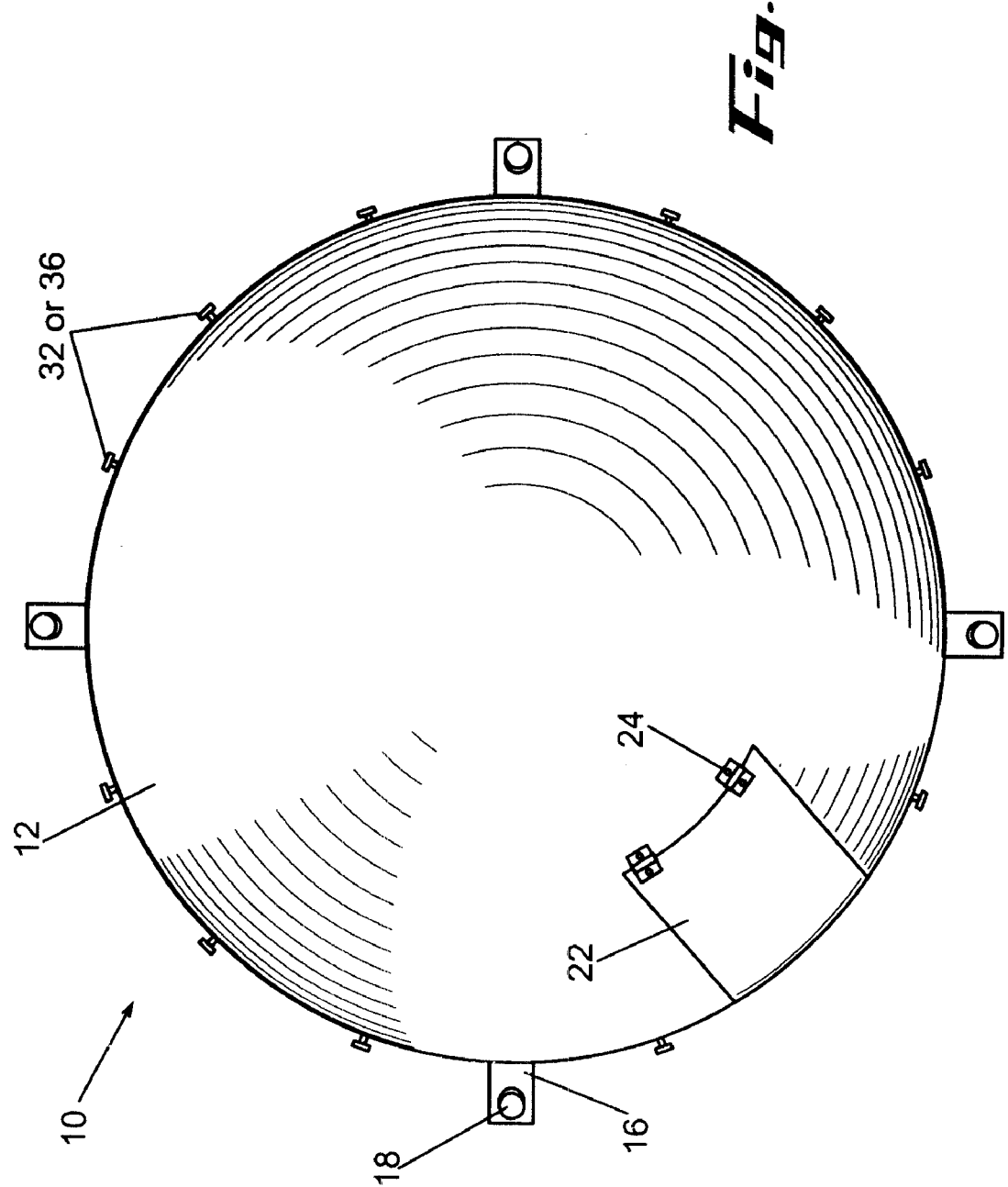

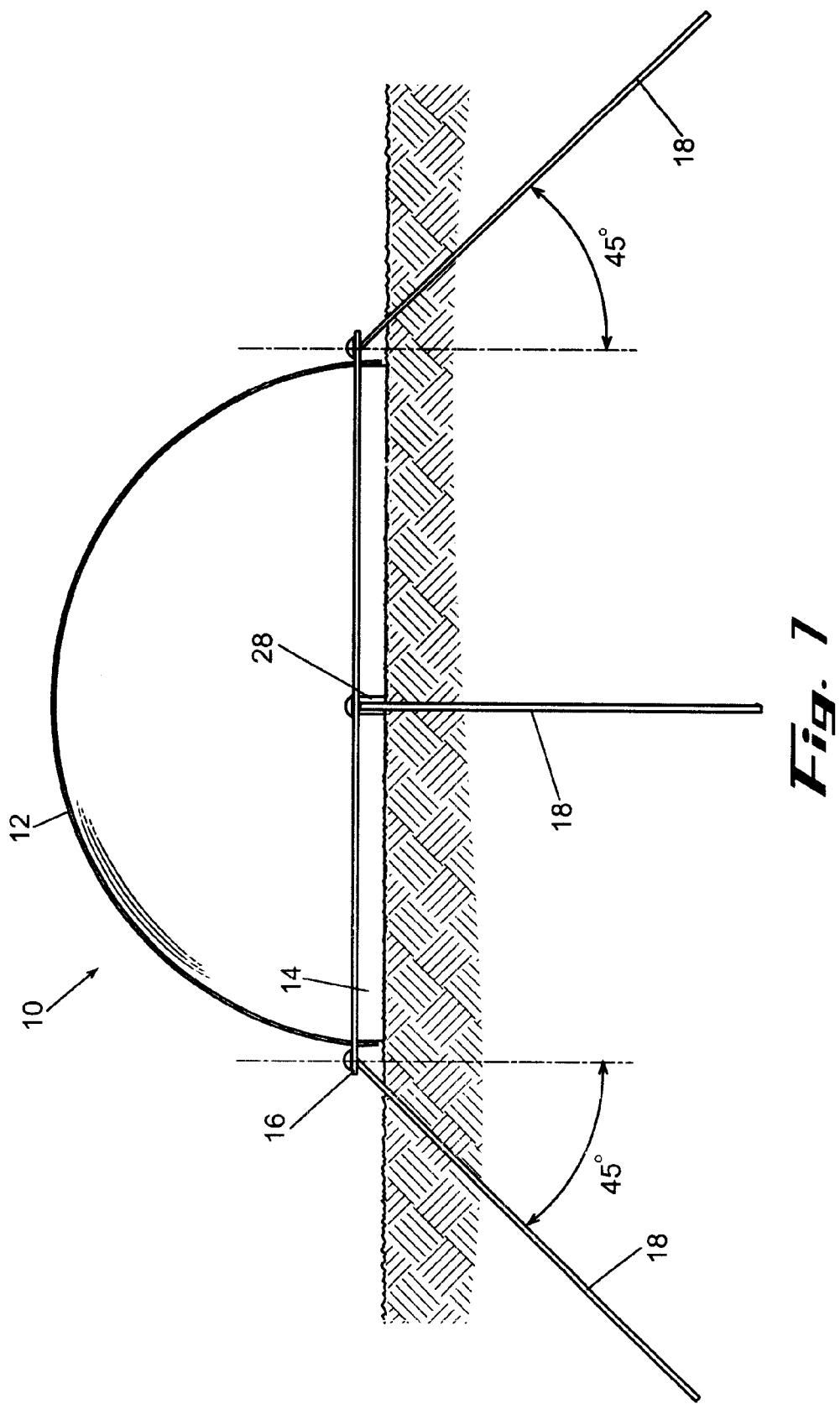

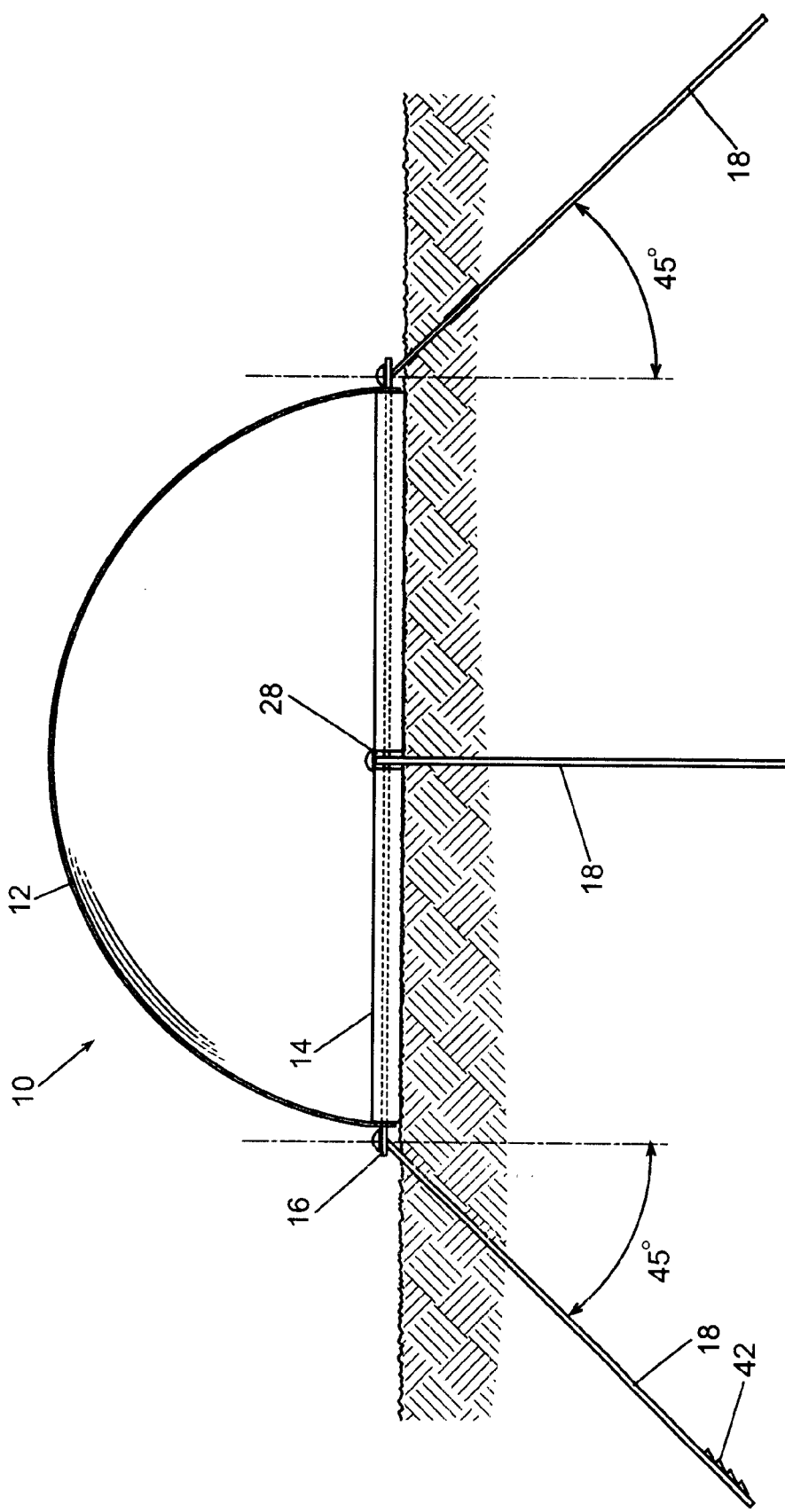

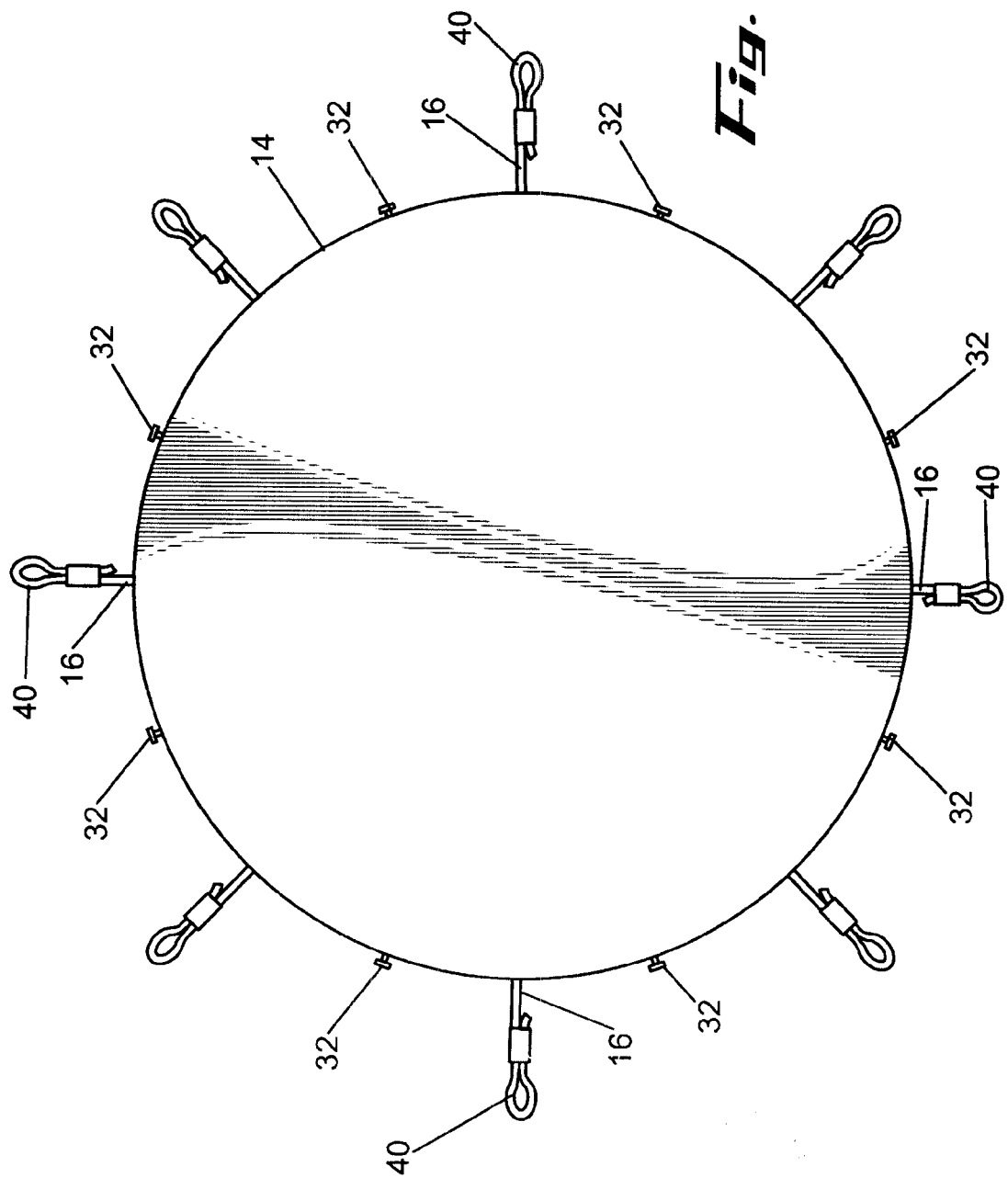

WEATHER SHELTER

BACKGROUND OF THE INVENTION

1. Technical Field.

The present invention relates generally to the field of shelters, and more specifically to a method and apparatus for an outdoor, aboveground, relatively inexpensive to construct shelter for protection from severe weather.

2. Prior Art.

Unsafe weather or natural climatic forces can strike without adequate warning causing property damage and placing human life in grave danger. These natural climatic forces often demolish homes and buildings. When humans remain indoors during such natural catastrophic events, they are in further danger from falling debris and from the possible collapse of the surrounding structures. For this reason, it is often advisable that persons evacuate their home or building or that persons remain in secured locations, such as basements. However, many homes lack basements, and people are often without safe shelter during these events.

Protective shelters have been recognized and utilized to protect humans from catastrophic weather, such as thunderstorms, hurricanes, and tornadoes. Not unexpectedly, such shelters have evolved and the prior art discloses an array of such shelters.

U.S. Pat. No. RE 26121 to Jackson discloses a type of building construction that incorporates means for resisting sudden shocks and for minimizing injury to occupants should the building collapse. The building has outwardly tilted walls, so that if the building collapses, the walls will fall outwardly away from the occupants. This building is a tethered permanent structure and only tangentially is a weather shelter.

U.S. Pat. No. 356,975 to Moss discloses a prefabricated shelter that has wall panels bowed and secured together in a dome-like structure. The multiple wall panels provide flexible joints, and allow ease of construction. Moss '975 is not a unitary structure and does not have a weighted slab base for optimal stability of the weather shelter.

U.S. Pat. No. 4,625,468 to Hampel discloses a double-wall tent structure quickly erectable over a central bench or hole. The tent structure includes tightly woven, rip-resistant fabric panels supported by tensile rods or wands, a tub floor extending into and lining a central trench or hole, and an exterior, light-reflecting, metalized, semi-transparent disposable membrane. The bottom circumferential edge of the outer membrane extends into a shallow trench or ditch, excavated around the perimeter of the inner tent structure. This is a lightweight tent structure likely incapable of withstanding a tornado or hurricane and thus not likely to protect humans from catastrophic weather.

U.S. Pat. No. 5,671,568 to Armanno discloses a hurricane shelter generally comprising a dome shaped cover, a cylindrically shaped base wall, and a central column. In its lower position, the dome rests on the base wall and provides shelter in an internal safe space for use in times of emergency, while the central column enables the dome to be raised and locked in its upper position well above the base wall to provide access to the safe space. The base wall forms a circle in plan view, matching in size the diameter of the lower portion of the dome that rests on this wall. The circular base and the dome shaped cover provide low resistance to the winds and to provide the strength to resist the force of hurricane winds, the base wall is connected to a foundation that is typically located on or below ground level. The foundation usually is constructed of heavy material such as concrete, and if desired, even greater strength and weight can be added by including a footing for the foundation. This structure is somewhat complex and is not likely to be manufactured in an inexpensive fashion. Moreover, the structure lacks an entrance doorway and thereby forces the user to raise the dome-like structure prior to entrance. The base is stabilized by adding additional weight on the base, which can further increase cost.

U.S. Pat. No. 6,131,343 to Jackson discloses an apparatus and method for a storm shelter that can be used aboveground and belowground, and may be skin supported. Jackson '343 discloses that its top, front, and rear surfaces can be made from a single, curved piece of material, and, that its sides are made from two straight pieces of material, all of which pieces are mounted onto parallel curved fine members which are mounted onto a base frame that is anchored to a foundation. This shelter preferably is a corrugated metal skin attached to a foundation. Importantly, this structure is not dome-like to withstand strong winds and does not disclose a stabilized, secured base.

While the prior proceeds to disclose an array of weather shelters, what is needed but not found in the prior art is a weather shelter that can withstand catastrophic weather and can be manufactured a flexible, inexpensive manner.

BRIEF SUMMARY OF THE INVENTION

The present invention relates generally to the field of shelters, and more specifically to a method and apparatus for an outdoor, aboveground shelter for protection from destructive weather that is relatively inexpensive to construct at a site, or to construct at a central manufacturing facility and to transport to a site. The weather shelter in one embodiment comprises a dome, a base, tie-bars, tie-down rods, and attachment means, wherein the base is secured to the earth using the tie-bars and tie-down rods and the dome-like structure is secured to the base using the attachment means.

The dome is a relatively lightweight and strong partial sphere having a hinged door allowing passage therethrough. The base is a relatively heavyweight and strong disc. The tie-bars are relatively high strength structures, such as steel bars or steel cables. The tie-down rods are relative high strength stakes, such as those used to stabilize utility poles. Attachment means can be any means for securely attaching the dome to the base, such as spikes, bolts, hooks, screws, and the like.

The base either can be prefabricated at a central manufacturing facility and transported to the final site on a flatbed truck, or can be manufactured at the final site. For example, for a concrete slab base, the base either can be poured and set a central manufacturing facility or poured on site. For bases with integral tie-bars, the dome and tie-downs are manufactured off-site or purchased, and transported to the final site. For bases without integral tie-bars, the dome, tie-bars, and tie-downs are manufactured off-site or purchased, and transported to the final site. At the final site, the base is poured or placed on a generally level surface (it may be necessary to level the surface prior to installation) and secured to the ground by inserting the tie-downs through peripheral holes in the tie-bars and staking the tie-downs into the ground, preferably at 45° degree angles relative to the vertical axis of the base.

The dome is attached to the base using the attachment means. The base can be manufactured with peripheral holes extending into and toward the center of the base, with or without peripheral nuts secured within the peripheral holes.

Alternatively, the base can be manufactured with screw-threaded rods extending radially and horizontally outward from the circumference of the base a short distances. Alternatively, high strength hooks or eyes can be manufactured into the circumference of the base. The dome comprises attachment holes spaced along the lower end, and proximal to the lower edge, of the dome, so that the attachment holes cooperate with the attachment means.

On-site, the dome is placed over the base and the attachment holes lined up with the attachment means. If the base has peripheral holes as attachment means, spikes are inserted through the attachment holes into the attachment means. If the base has peripheral nuts secured within peripheral holes as the attachment means, bolts are inserted through the attachment holes and into the peripheral holes where the bolts are then screwed into the nuts. If the base has outwardly extending screw-threaded rods as the attachment means, the screw-threaded rods are inserted through and extend outwardly through the attachment holes, and a nut is screwed over the outside end of the screw-threaded rods. If hooks are used as the attachment means, the hooks are hooked through the attachment holes.

One enters and exits the shelter through a doorway, closed by a door. The door has hinges to attach the door to the shelter, creating a doorway. The door is reversibly closable to the dome by a sealant material such as, for example, a Velcro® hook and loop type of fastener, a zipper or zippers, snaps, hooks and eyes, or the like. A handle allows the user to open and close the door. The use of a Velcro® hook and loop type of fastener allows air to enter and exit the shelter for breathing, and also allows the pressure inside of the shelter to equalize to the pressure outside of shelter.

Therefore it is an object of the present invention is to provide a simple to manufacture, easy to use shelter.

It is another object of the present invention is to provide a weather shelter that can provide means to protect persons and property from the elements of weather.

It is another object of the present invention to provide a weather shelter that can be used for a short duration.

It is another object of the present invention to provide a weather shelter that can be easily and relatively cheaply manufactured on site.

It is another object of the present invention to provide a prefabricated weather shelter kit whose components are manufactured at a central site and then transported to a desired site where the components are pieced together to form the finished shelter.

It is another object of the present invention is to provide a weather shelter that is a partial dome securely anchored to a base that is directly or indirectly secured to the earth.

It is another object of the present invention to provide a reclosable pressure-equalizing opening on the dome of the weather shelter for relatively easy entrance into the shelter.

These objects, and other object, features and advantages of the present method, will become more apparent to those of ordinary skill in the art when the following detailed description of the preferred embodiments is read in conjunction with the appended figures, in which like reference numerals represent like components throughout the various figures.

BRIEF DESCRIPTION OF THE FIGURES

FIG. 6 is a top view of the shelter in one embodiment showing the tie rods extending beyond the circumferential edge of the base of the weather shelter.

FIG. 7 is a side cross-sectional view of the weather shelter in one embodiment showing the tie-bars (set on top of the base) and the tie down rods in an embodiment.

FIG. 8 is a side cross-sectional view of the weather shelter in one embodiment showing the tie-bars (set within of the base) and the tie down rods in an embodiment.

FIG. 10 is a top view of the base illustrating an alternate cable tie-bar.

DETAILED DESCRIPTION OF THE INVENTION

The present invention relates generally to the field of shelters, and more specifically to a method and apparatus for an outdoor, aboveground shelter for protection from destructive weather that is relatively inexpensive to construct and transport. The present apparatus provides an improved weather shelter and the method provides an easy and inexpensive way of constructing the weather shelter.

Figure 1:
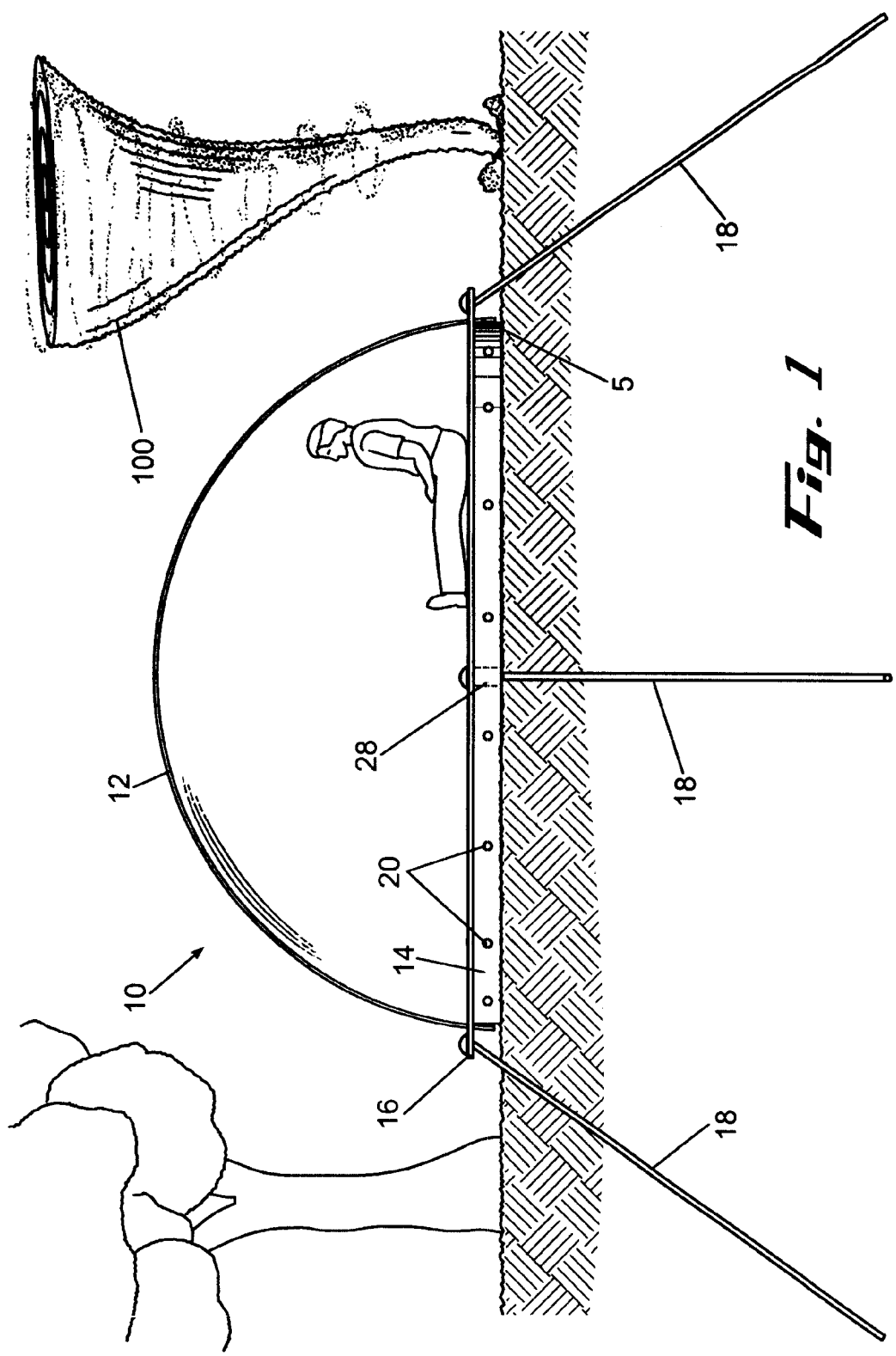
FIG. 1 is a side cross-sectional view of the weather shelter in one embodiment.

Referring to FIG. 1, one embodiment of the weather shelter 10 comprises dome 12, base 14, tie-bars 16, tie-down rods 18, and attachment means 20. Base 14 can be made from materials such as concrete, reinforced concrete, stone, aggregates, asphalt or any relatively heavyweight, relatively strong, stable material. For example, in one embodiment, base 14 can be a 4" to 8" thick circular slab of concrete having a predetermined diameter depending on the desired final shelter size and use. Base 14 can have a slightly smaller diameter than dome 12 so that dome 12 extends over base 14 and the interior surface of dome 12 can be in contact with or be proximal to the circumferential edge (periphery) 5 of base 14. The use of a slab adds weight to shelter 10, helping to prevent shelter 10 from moving or blowing away in even the fiercest storm, such as a tornado. Base 14 either can constructed on site, or can be prefabricated and delivered to the site. Base 14 has a plurality of peripheral holes 30 or bolts 32 serving as the attachment means 20 for dome 12. Base 14 also may have a central hole 28 to serve as an additional tie-down location.

Figure 2:
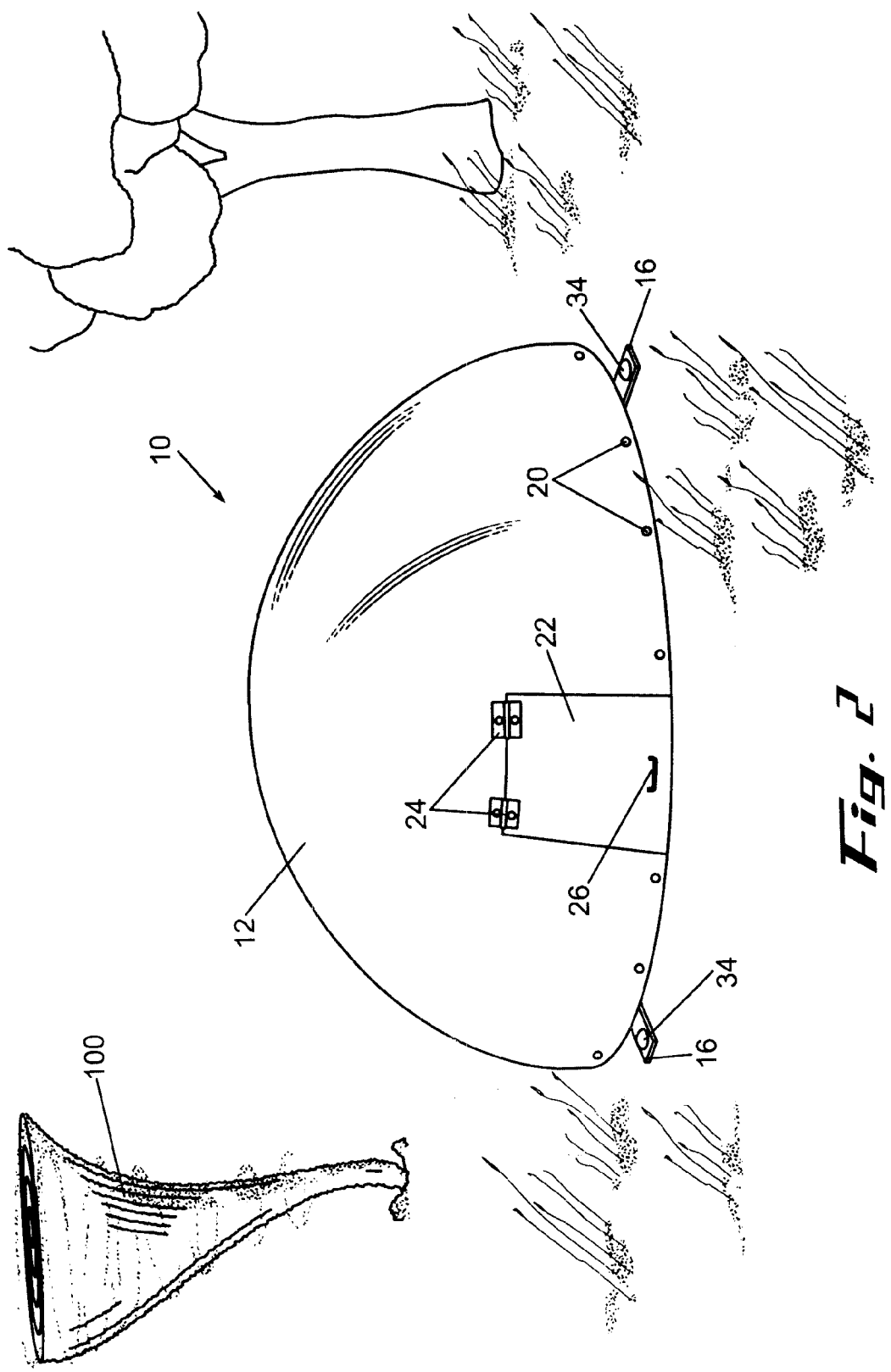
FIG. 2 is a perspective view of the dome element of the weather shelter in one embodiment showing the doorway.

Referring to FIG. 2, dome 12 in one embodiment is a half-sphere or somewhat less than a half-sphere, unitary structure made of fiberglass, metal, plastic, Kevlar®, carbon fiber or other relatively lightweight, relatively strong material. Dome 12 has door 22 with hinges 24 and handle 26 for entry and exit.

Figure 3:
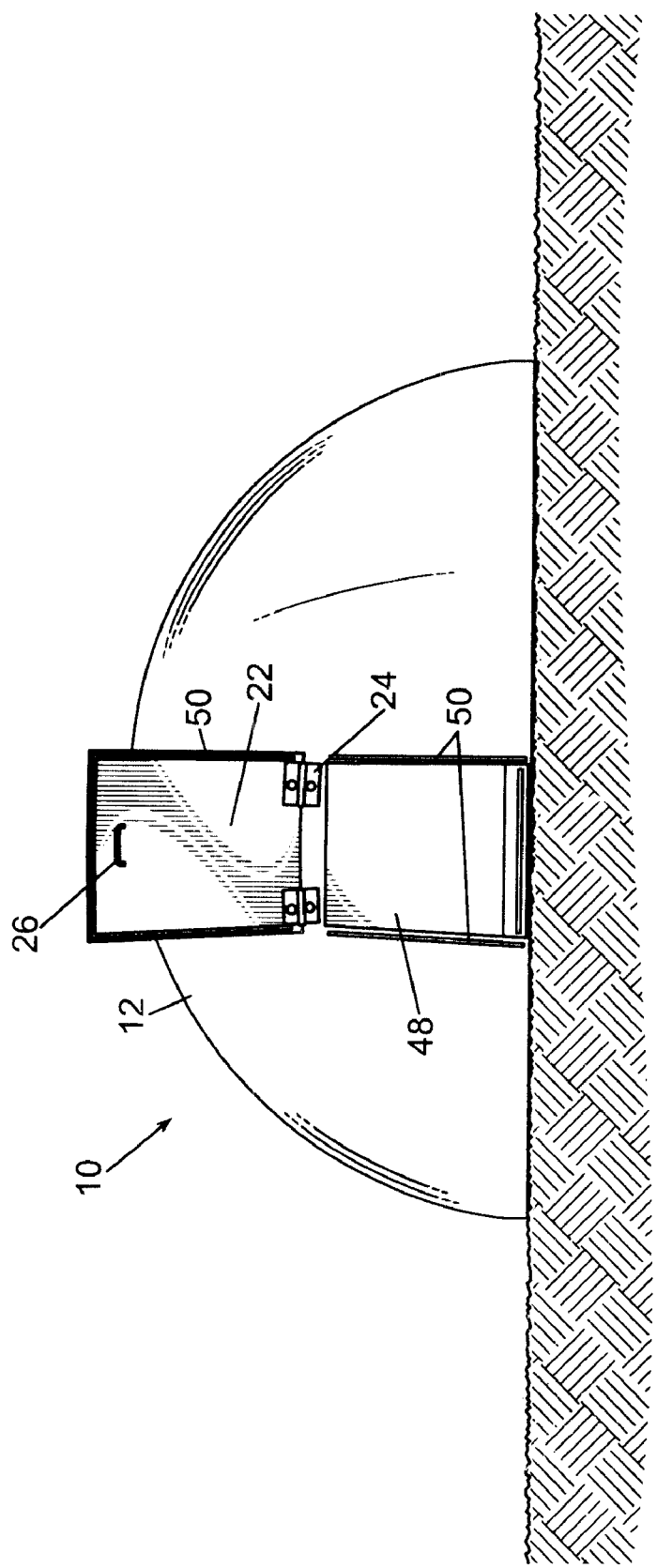
FIG. 3 is a front perspective view of the door in one embodiment.
Figure 4:
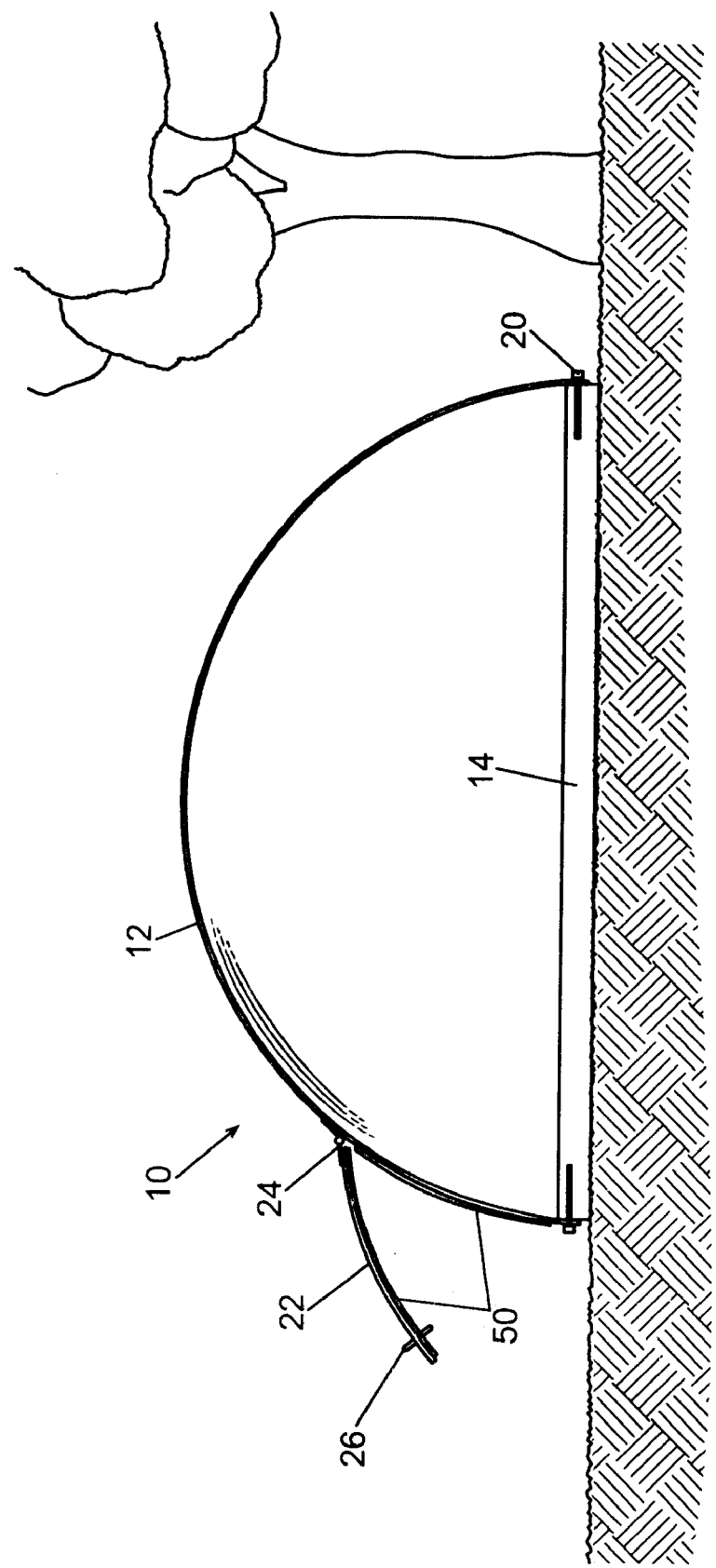
FIG. 4 is a side cross-sectional view of the door in one embodiment.

Referring to FIG. 3, which is a front elevational view of shelter 10 with door 22 open, and FIG. 4, which is a side cross-sectional view of shelter 10 as shown in FIG. 3, in one embodiment, door 22 has hinges 24 on the top edge of door 22 and reversibly closes doorway 48 by securing door 22 to the remainder of dome 12 by a sealant material such as, for example, a Velcro® hook and loop type of is fastener, a zipper or zippers, snaps, hooks and eyes, or the like. Handle 26 allows the user to open and close doorway 48. It is understood that a single or a plurality of hinges can function as hinges 24 and that a simple opening can function as doorway 48.

As disclosed above, the periphery of door 22 and doorway 48, which can include the part of base 14 immediately below door 22, are partially or completely surrounded with a reclosable sealant material fastener such as a Velcro® hook and loop type of fastener. The use of a Velcro® hook and loop type of fastener allows air to enter and exit shelter 10 for breathing, and also allows the pressure inside of shelter 10 to equalize to the pressure outside of shelter 10. This is very important when a tornado 100 passes by shelter 10, as the ambient pressure created by a tornado 100 may be, and generally is, less than the pressure within a structure, such as shelter 12. Further, the use of a Velcro® hook and loop type of fastener allows door 22 to pop open and close in doorway 48 easily if the pressure outside of shelter 10 suddenly drops.

Figure 5:
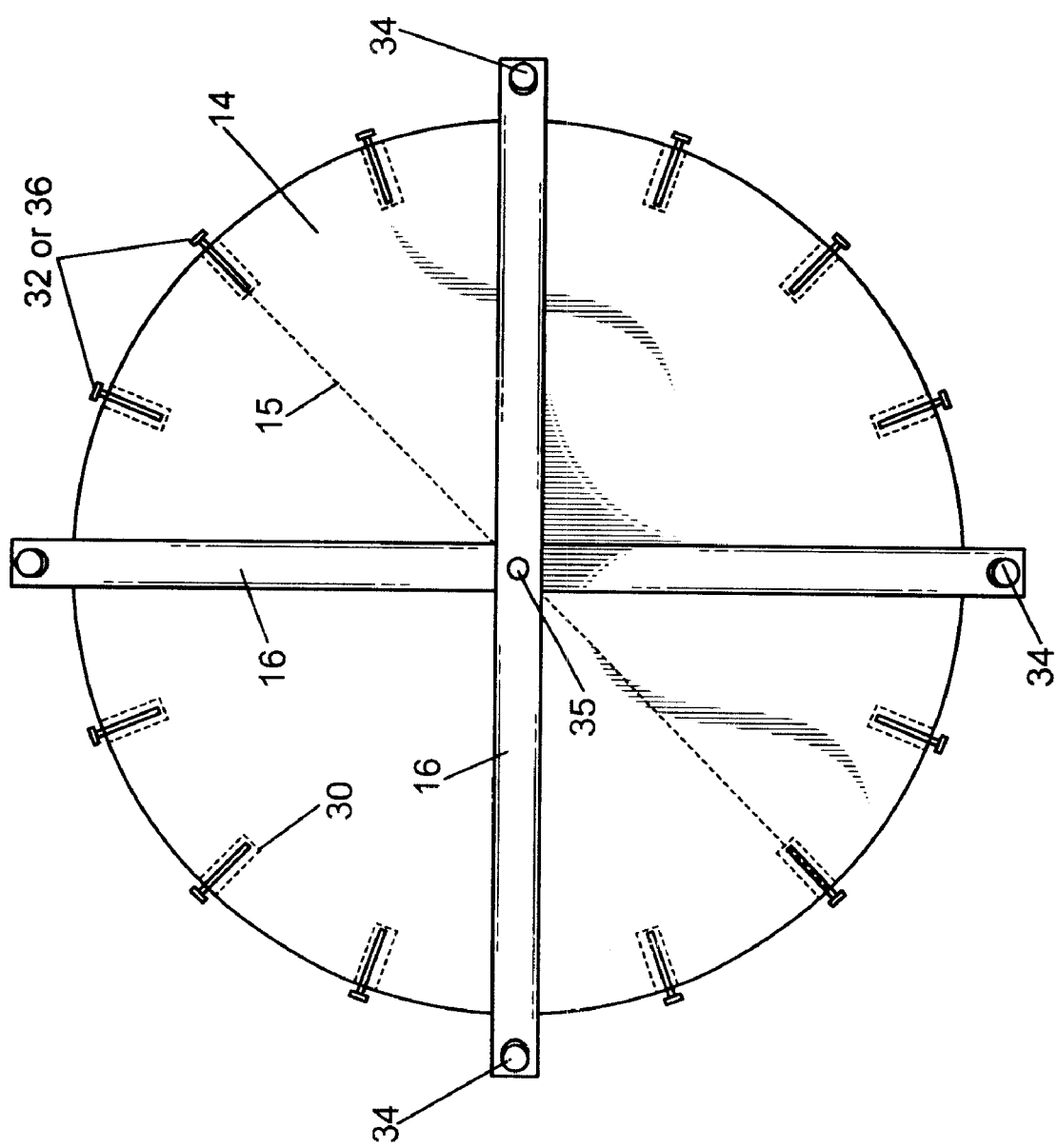
FIG. 5 is a top view of the weather shelter without the dome, showing a configuration for the tie bars and attachments means.

Referring to FIG. 5, which is a top view of one embodiment of shelter 10 without dome 12, and FIG. 7, which is a side cross-sectional view of the embodiment of FIG. 5 with dome 12, tie-bars 16 are at least one, and generally no more than four, bars. Tie-bars 16 can be made from any relatively high strength relatively rigid material such as, for example, steel, aluminum, titanium, carbon fiber reinforced polymers, other metals and polymers or the like. Alternatively, tie-bars 16 can be made from any relatively high strength relatively flexible material such as, for example, steel cable or other metal or high tensile strength cable. Tie-bars 16 are of a strength designed to hold shelter 10 safely to the ground during even the fiercest storm.

Tie-bars generally can be example approximately 1" thick and 4" wide, if a bar, or an appropriately sized cable. If a bar, each tie-bar 16 has end hole 34 proximal to each end and optionally central hole 35 midway along the length of tie-bar 16. If a cable, tie-bar 16 has an appropriate loop 40, as shown in FIG. 10. Tie-bars 16 are somewhat longer than diameter 15 of base 14, such that proximal holes 34 or loops 40 extend beyond the periphery of base 14 so that attachment means 20 may be inserted through peripheral holes 34 or loops 40 and be is anchored into the ground without being interfered with by base 14. If more than one bar-style tie-bar 16 is used, central holes 35 of each tie-bar 16 must line up with each other.

Whether tie-bars 16 lie on top of base 14 or are constructed within base 14 depends on the method employed by the user or builder to construct shelter 10, or on the user's preferences. For illustrative purposes, if base 14 is constructed on-site, tie-bars 16 can be placed within the material of base 14 during the formation of base 14, or can be laid on top of base 14 after base 14 has been poured and set, if made on-site, or merely laid on top of base 14 after base 14 has been delivered and placed on the appropriate generally level surface. For example, if based is constructed from concrete and the concrete for base 14 is poured on-site, about half of the concrete for base 14 will be poured, tie-bars 16 laid in a cross-like manner on the wet concrete, and the remainder of the concrete poured on top of tie-bars 16. For another example, if base 14 is prefabricated and delivered to the site, tie-bars 16 can be laid in a cross on top of base 14 with peripheral holes 34 extending over the edge of base 14, and central holes 35 aligned with each other over central hole 28 of base 14.

Referring to FIG. 6, which is a top view of one embodiment of shelter 10, dome 12 surrounds and fits completely over the top surface of base 14 and is attached to base 14 via attachment means 20. Tie-bars 16 extend beyond the outer edge of base 14 far enough so that peripheral holes 34 are not over or obscured by base 14. Door 22 and hinges 24 provide for entry and exit into and out of shelter 10.

Referring to FIG. 7 and FIG. 8, which are side cross-sectional views of alternative embodiments of shelter 10, the securing of shelter to the ground is shown in more detail. In the embodiment shown in FIG. 8, tie-bars 16 are integral with base 14. In the embodiment shown in FIG. 7, tie-bars 16 are laid over the top of base 14. In both embodiments, tie-down rods 18 can be barbed rods such as those used in supporting utility poles. In effect, tie-down rods 18 are very large stakes approximately 1" in diameter and 10' long and individual tie down rods 18 are placed through each peripheral hole 34 and central hole 28. In one embodiment, one tie-down rod 18 is placed through each of the peripheral holes 34 of tie-bars 16 and one additional tie-down rod 18 is placed through the aligned central holes 35 of the crossed tie-bars 16 and the central hole 28 of the base 14. This is shown from the top in FIG. 5. Tie-down rod 18 inserted through central hole 28 is optional and adds more security. Tie-down rods 18 are inserted into the ground generally at approximately a 45° angle, and even more generally at approximately a 30° to 60° angle, but can be inserted at an angle of the user's discretion. Barbs 42 shown in FIG. 8 assist in holding base 14, and therefore shelter 10, securely to the ground.

Although the penetration angle of tie-down rods 18 into the ground can vary from 0° to 180°, an approximately 45° angle is preferred for at least two reasons. First, having several tie-down rods 18 anchored into the ground at 45° angles can help prevent shelter 10 from "floating," which may happen if tie-down rods 18 are pounded into the ground at 90° angles. Second, a 45° angle allows any water traveling down through the ground to only contact tie-down rods 18 for a short time (the water wants to travel at a 90°, that is, straight downward), thus lessening the chance of corrosion of tie-down rods 18. Tie-down rods 18 anchor shelter 10 to the ground.

Referring to FIG. 9, various example embodiments of attachment means to hold dome 12 to base 14 are shown. Attachment means 20 can be bolts 32 or spikes 36 that fit within peripheral holes 30 on base 14. In a first alternative embodiment, for example, when the concrete for base 14 is formed, peripheral holes 30 can be formed in the circumferential edge of base 14 while the concrete is still wet to later receive bolts 32 or spikes 36. In a second alternative embodiment, for example, when the concrete for base 12 is poured, bolts 32 can be placed in the wet concrete with the threaded end of bolts 32 extending outward from the concrete, so that dome 12 is secured via nuts 38. In a third alternative embodiment, for example, if base 14 is prefabricated and delivered to the site already hardened, base 14 can be prefabricated either with peripheral holes 30 or extruding bolts 32. In a fourth alternative embodiment, for example, nuts 38 can be placed within peripheral holes 30 for receiving and securing bolts 32. In a fifth alternative embodiment, hooks 44 can be placed within peripheral Is holes 30, or placed within the wet concrete, and hooked onto dome 12. In each embodiment, spike 36, bolt 32, or hook 44, is inserted through attachment holes of dome 12 to secure dome 12 to base 14.

Figure 9A:
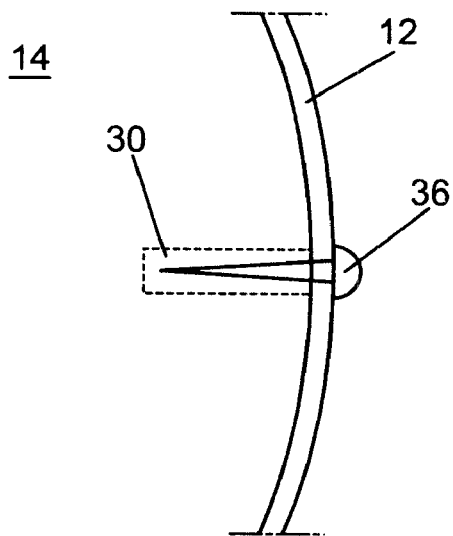
FIG. 9 is view of three (3) examples of attachment means, namely, spikes (top cross-section FIG. 9A), bolts and nuts (top cross-section FIG. 9B), bolts (top cross-section FIG. 9C), and hooks (side cross-section FIG. 9D).
Figure 9B:
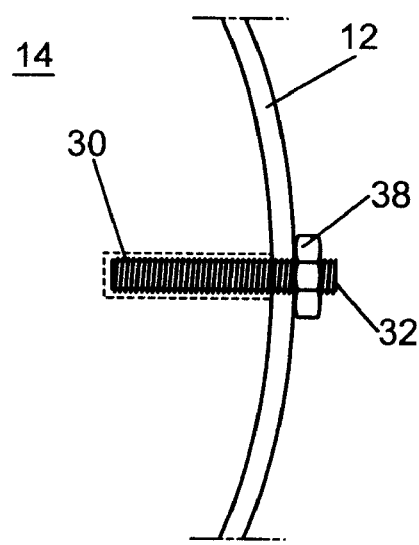

Attachment means 20 can depend on the method by which shelter 10 is constructed and the user's preferences. For example, if the concrete for base 14 is poured on-site, dome 12 can be placed over the wet concrete so that the interior surface of dome 12 will be proximal to or contact the circumferential edge or periphery of base 14. Spikes 36 can be driven through the material of dome 12 itself, or inserted through pre-formed attachment holes 20 in dome 12 into the wet concrete of base 14, one embodiment of which is shown in FIG. 9A. Similarly, bolts 32 can be inserted through pre-formed attachment holes 20 into the wet concrete, one embodiment of which is shown in FIG. 9B. When the concrete dries, a unitary shelter 10 structure results, which can be difficult to disassemble.

Alternatively, if the concrete for base 14 is poured on-site, and bolts 32 are placed threaded end outward in the wet concrete, when the concrete dries, bolts 32 are permanently anchored in base 14. Dome 12 then can be placed over base 14, bolts 32 passed through pre-formed attachment holes 20 in dome 12, and nuts 38 screwed onto bolts 32, thus releasably holding dome 12 to base 14. If base 14 is pre-fabricated and delivered to the site already hardened, base 14 can be pre-fabricated either with peripheral holes 30 for receiving spikes 36 or with bolts 32 for receiving nuts.

Figure 9C:
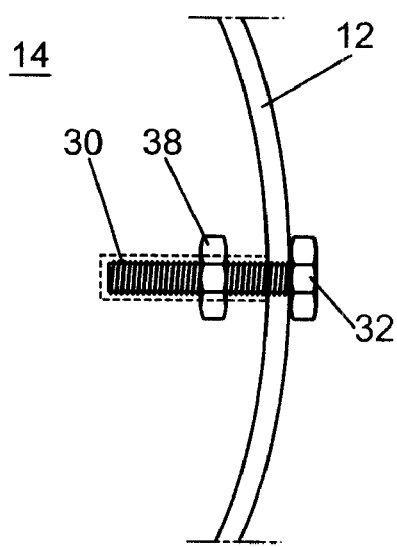
Figure 9D:
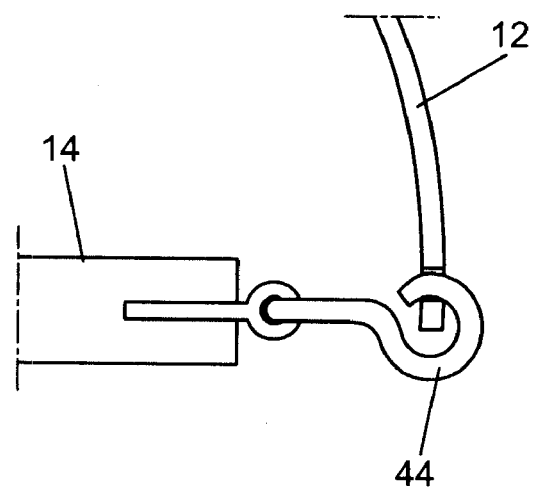

Alternatively, threaded receptor nuts 38 can be placed in the wet concrete of base 14, either on-site or during prefabrication, one embodiment of which is shown in FIG. 9C. If threaded receptor nuts 38 are set, when dome 12 is placed over base 14, bolts 32 can be inserted through pre-formed attachment holes 20 in dome 12 and threaded into the threaded receptor nuts 38.

Referring to FIG. 10, cable tie-bars 16 are shown. The number of tie-bars 16 used depends on the strength of the tie-bars 16 themselves and the strength of the desired connection between the shelter 10 and the ground. Tie-bars 16 such as the cable tie-bars shown in FIG. 10 alternatively can be attached to tie-down rods 18 using hooks or turnbuckles if tie-down rods 18 have corresponding eyelets.

It is contemplated that shelter 10 can have no openings except for door 22 and doorway 48, thus preventing excess wind or rain from entering shelter 10. Although this may make the interior of shelter 10 hot and stuffy, such discomfort should be tolerable for the short duration for the user is likely to be in shelter 10 during a tornado or other extreme weather situation.

The above detailed description of the preferred embodiments, the appendix and the appended figures are for illustrative purposes only and are not intended to limit the scope and spirit of the invention, and its equivalents, as defined by the appended claims. One skilled in the art will recognize that many variations can be made to the invention disclosed in this specification without departing from the scope and spirit of the invention.

What is claimed is:

1. A weather shelter comprising:
   a. a base having a thickness and a peripheral edge, wherein said base is secured to the ground by means of at least one tie-bar having ends extending beyond the peripheral edge of said base and at least one tie-down rod cooperating with said at least one tie-bar;
   b. a dome having an inner circumferential edge, wherein said dome fits completely over said base, said inner circumferential edge of said dome cooperates with and attaches to said peripheral edge of said base by an attachment means; and
   c. a doorway located through said dome, wherein said doorway allows for entrance into and exit from said weather shelter.

2. The weather shelter characterized in claim 1, wherein said dome is constructed from a single unitary material selected from the group consisting of carbon fiber materials, metals,. plastics, fiber-reinforced polymers, fiberglass, and Kevlar.

3. The weather shelter characterized in claim 1, wherein said weather shelter comprises at least two of said tie-bars.

4. The weather shelter characterized in claim 1, wherein said attachment means is selected from the group consisting of screws, bolts, spikes, hooks, and nails.

5. The weather shelter characterized in claim 1, wherein said at least one tie-down rod is inserted into a surface at an angle between 30 to 60 degrees from horizontal.

6. The weather shelter characterized in claim 1, wherein said dome is releasably attached to said base.

7. The weather shelter characterized in claim 1, wherein said at least one tie-bar is secured to a surface by at least one tie-down rod.

8. The weather shelter characterized in claim 1, wherein said base contains materials selected from the group consisting of concrete, reinforced concrete, stone, and asphalt.

9. The weather shelter characterized in claim 1, wherein said base is between 3 and 8 inches thick.

10. The weather shelter characterized in claim 1, wherein said doorway in said dome is closed by means of a reclosable door.

11. The weather shelter characterized in claim 10, wherein said reclosable door. is secured to said weather shelter by hinges.

12. The weather shelter characterized in claim 11, wherein said reclosable door is secured to said weather shelter by a fastener that is not airtight.

\* \* \* \* \*